United States Patent [19]
Fox et al.

[11] Patent Number: 4,771,281
[45] Date of Patent: Sep. 13, 1988

[54] BIT SELECTION AND ROUTING APPARATUS AND METHOD

[75] Inventors: Thomas F. Fox, Boston; Richard G. Bahr, Framingham, both of Mass.

[73] Assignee: Prime Computer, Inc., Natick, Mass.

[21] Appl. No.: 14,134

[22] Filed: Jan. 29, 1987

Related U.S. Application Data

[63] Continuation of Ser. No. 579,092, Feb. 10, 1984, abandoned.

[51] Int. Cl.[4] .............................................. H04Q 1/00
[52] U.S. Cl. ........................... 340/825.02; 340/825.03; 340/825.83
[58] Field of Search ......... 340/825.02, 825.79–825.93, 340/825.03; 307/243, 463, 465, 241, 449; 84/1.01, 1.03; 328/103, 104, 152; 379/273, 272, 292, 268

[56] References Cited

U.S. PATENT DOCUMENTS

| | | | |
|---|---|---|---|
| 2,997,908 | 8/1961 | Hilborn | 84/1.01 |
| 3,165,719 | 1/1965 | Mueller | 340/166 |
| 3,343,138 | 9/1967 | Ulrich | 340/172.5 |
| 3,343,139 | 9/1967 | Ulrich | 340/172.5 |
| 3,360,779 | 12/1967 | Ulrich | 340/172.5 |
| 3,365,703 | 1/1968 | Ulrich | 340/172.5 |
| 3,370,274 | 2/1968 | Kettley et al. | 340/172.5 |
| 3,391,394 | 7/1968 | Ottaway et al. | 340/172.5 |
| 3,562,418 | 2/1971 | Glusick et al. | 340/825.79 X |
| 3,619,583 | 11/1971 | Arnold | 307/465 X |
| 3,715,444 | 2/1973 | Pearlman | 84/1.01 |
| 3,728,689 | 4/1973 | Edwards, Jr. | 340/172.5 |
| 3,846,759 | 11/1974 | Drake et al. | 340/172.5 |
| 3,946,366 | 3/1976 | Edwards, Jr. | 340/172.5 |
| 3,984,817 | 10/1976 | Barbour et al. | 340/172.5 |
| 4,009,468 | 2/1977 | Calcagno et al. | 340/147 C |
| 4,032,893 | 6/1977 | Moran | 340/166 R |
| 4,054,945 | 10/1977 | Ichiko et al. | 340/172.5 |
| 4,149,239 | 4/1979 | Jenkins et al. | 364/200 |
| 4,150,430 | 4/1979 | Gusev et al. | 364/200 |
| 4,293,735 | 10/1981 | Duret | 179/18 GE |
| 4,453,096 | 6/1984 | Le Can et al. | 307/243 |
| 4,481,623 | 11/1984 | Clark | 340/825.02 X |

OTHER PUBLICATIONS

C. E. Ruoff, Triangular Matrix Array, IBM Technical Disclosure Bulletin, vol. 3, No. 5, Oct. 1960, p. 48.

*Primary Examiner*—Ulysses Weldon
*Attorney, Agent, or Firm*—Lahive & Cockfield

[57] ABSTRACT

A bit selection and routing apparatus and method selects m data signals from among its n available data inputs and groups those m signals on its output lines. The apparatus employs a two-dimensional array of signal selection elements which are multiplexing elements. The circuitry is implemented in NMOS technology using pass transistors. The apparatus can be placed in a data flow path and can pass data either unaltered, in a selection mode, in a shift mode, and in a partial data pass mode wherein an upper portion of the input word is set to a predetermined value. The selection elements are connected to route the selected input signals to selected output lines in a predetermined order.

12 Claims, 3 Drawing Sheets

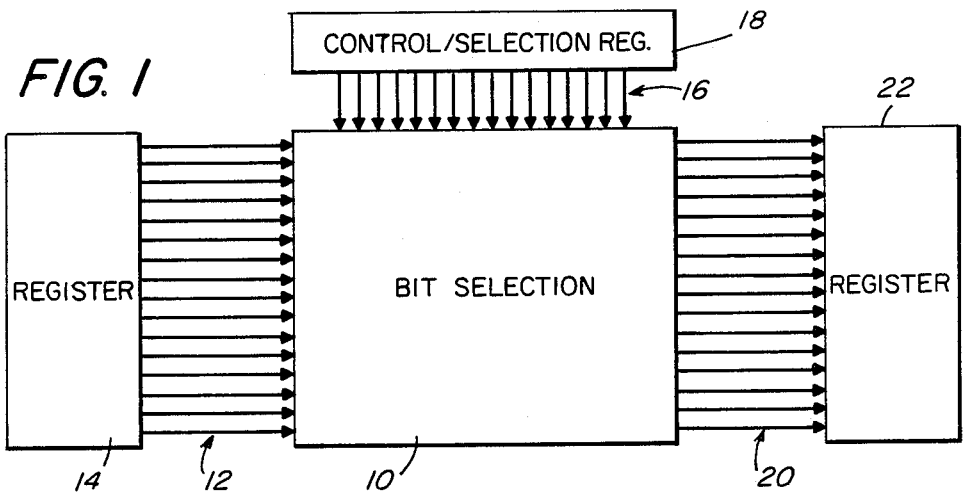
FIG. 1
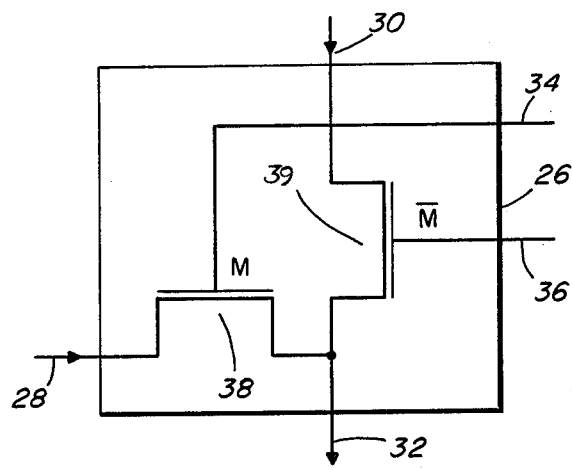
FIG. 3
FIG. 5
(a) INPUT WORD (REGISTER 14) | p | o | n | m | l | k | j | i | h | g | f | e | d | c | b | a |
(b) ROUTING CONTROL WORD (REGISTER 18) | 0 | 0 | 0 | 1 | 0 | 0 | 0 | 1 | 0 | 1 | 0 | 0 | 1 | 0 | 0 | 0 |
(c) OUTPUT WORD (REGISTER 22) | 0 | 0 | 0 | 0 | 0 | 0 | 0 | 0 | 0 | 0 | 0 | 0 | m | i | g | d |
(d) BIT PASSING CONTROL WORD (REGISTER 18) | 0 | 0 | 0 | 0 | 0 | 0 | 0 | 0 | 1 | 1 | 1 | 1 | 1 | 1 | 1 | 1 |
(e) OUTPUT WORD (REGISTER 22) | 0 | 0 | 0 | 0 | 0 | 0 | 0 | 0 | h | g | f | e | d | c | b | a |
(f) SHIFT CONTROL WORD (REGISTER 18) | 0 | 0 | 0 | 0 | 1 | 1 | 1 | 1 | 1 | 1 | 1 | 1 | 0 | 0 | 0 | 0 |
(g) OUTPUT WORD (REGISTER 22) | 0 | 0 | 0 | 0 | 0 | 0 | 0 | l | k | j | i | h | g | f | e |
(h) PASS THROUGH CONTROL WORD (REGISTER 18) | 1 | 1 | 1 | 1 | 1 | 1 | 1 | 1 | 1 | 1 | 1 | 1 | 1 | 1 | 1 | 1 |
(i) OUTPUT WORD (REGISTER 22) | p | o | n | m | l | k | j | i | h | g | f | e | d | c | b | a |

BIT SELECTION AND ROUTING APPARATUS AND METHOD

This application is a continuation of application Ser. No. 579,092, filed Feb. 10, 1984, now abandoned.

BACKGROUND OF THE INVENTION

The invention relates generally to data processing apparatus and methods, and in particular to the selection and collection of data bits from a data word.

During the processing of instructions in a data processing apparatus, it is common to instruct the apparatus to effect a program flow modification according to the value of a selected group of data bits in a stored or recently generated data word. Typically, it is desired to employ the selected bits to determine the address of a next program instruction for the apparatus. This is typically known as a computed GO TO instruction. While it is possible to search out the selected bits using software or firmware (microcode) programs, it is preferable to implement a hardware circuitry to increase throughput performance; however logic circuitry may increase faster than linearly with the number of bits being selected and may not operate satisfactorily under severe time constraints.

One such circuit is described in Calcagmo et al, U.S. Pat. No. 4,009,468. This logic network, designated a data concentrator, presents on its output lines, a number of bits selected from an input word having some larger number of bits. The Calcagmo circuitry has two operating sections, an enabling section and a performing section as described in the patent. The resulting circuitry requires a significant number of logic elements, especially for the performing section selection circuitry which provides for the selected bit outputs.

It is therefore an object of the present invention to provide a high speed, low hardware requirement, logic network which can be employed in a bus data path for selecting from among the bits at its input in accordance with a control word, and providing those selected bits at its output. Other objects of the invention are to provide a bit selection apparatus and method for quickly enabling multi-way branching, byte selection, and one-way shifting. Further objects of the invention are a bit select apparatus and method which can be implemented in MOS technology.

SUMMARY OF THE INVENTION

The invention relates to a bit selection and routing apparatus and method for selecting up to "m" bits from among "n" possible available data bits of a word, where "m" is less than or equal to "n". The apparatus features a two-dimensional array of signal selection elements, the array having at least "m" columns. Each of the "m" columns has at least "n−m+1" elements connected in a serial sequence, and a first element of a column is designated the beginning element. The columns are sequentially designated the first column, the second column, etc. The first column has "n" connected elements, the second column has "n−1" connected elements, and each successive next column has one less element than the preceding column.

Each data selection element features a first data input, a second data input, a selection control signal input, and a data output. The signal available at the data output corresponds to the signal at the first data input when the control signal applied to the element is in a first state and corresponds to the signal available at the second data input when the control signal is in a second state.

The elements in each column are connected in a serial sequence or chain, and within the sequence, are designated the first element of the column, which is the beginning element, the second element (connected to the first element), etc. The second data input to an element of a serial sequence, is the data output of the next occurring earlier element (for example, the second element second data input connects to the third element data output), except that the second data input of the ending or last element of the sequence or chain is a predetermined signal level.

The "n" elements of the first column have as their first data inputs, respectively, the "n" data bits of which at most "m" are to be selected. The several columns are then interconnected, through the first data inputs, as follows. The beginning elements of the second and each succeeding column have as their respective first data inputs, the second data input of the beginning element of the next preceding column. (Thus the first data input of the beginning element of column i (i>1) is the second data input of the beginning element of column i−1.) Each other element of the second and each succeeding column has, as its respective first data input, the second data input of a corresponding element in a next preceding column. (Thus, the first data input of element j of column i (i>1) is the second data input to element j of column i−1.) Each group of corresponding elements, for all columns, receives the same control signal input for designating the input to be selected.

The selected bits are available respectively at the output of the beginning elements of the first columns corresponding to the number of selected bits. In a preferred embodiment, an extra column is provided and the outputs of the elements of the last column will be the predetermined signal level, preferably a logical "zero".

In accordance with the method of the invention, there are featured the steps of connecting a plurality of signal selection elements in a two-dimensional array wherein the array has at least m columns, each column having a beginning element, and the first column having n elements. The method further features connecting the selection elements for routing the m selected inputs to the least significant portion of the array signal outputs. The signal selection elements are the same as those described above.

DESCRIPTION OF THE DRAWINGS

Other objects, features, and advantages of the invention will appear from the following description of a preferred embodiment taken together with the drawings in which:

FIG. 1 is a general block diagram of the environment in which the invention can be employed;

FIG. 3 is an electrical schematic of a preferred form of the selection element of FIG. 2 using NMOS enhancement mode transistors;

FIG. 5 is an illustrative representation of the various bit patterns as they pass through, and control, the selection apparatus according to the invention.

DESCRIPTION OF A PREFERRED EMBODIMENT

Figure 2:
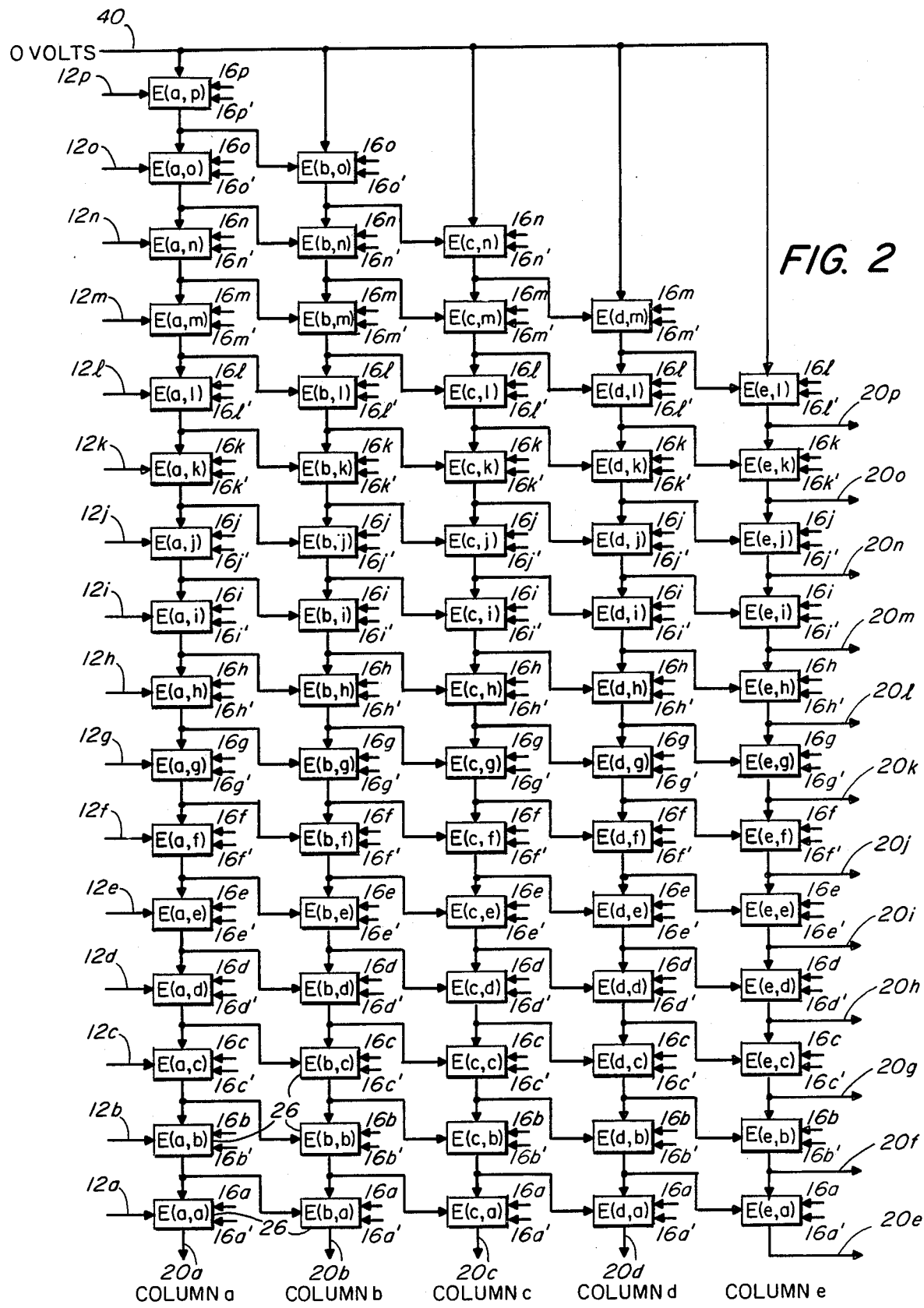
FIG. 2 is an electrical block diagram of the two-dimensional array of selection elements which form the bit selection apparatus according to the preferred embodiment of the invention.

Referring to FIG. 1, a bit selection apparatus 10 receives data inputs over lines 12, in the illustrated embodiment, from a data word stored in an input register 14. In other embodiments of the invention the input lines 12 can be lines from memory, a data bus, etc. The bit selection apparatus further receives selection and control signals over a plurality of lines 16. The illustrated lines 16 originate from a control bit selection register 18. The output of the bit selection apparatus 10 over lines 20 is received, in the illustrated embodiment, by an output register 22.

In operation, the bit selection apparatus 10 routes the selected input bits of the data word received over lines 12, as determined by the control signals over lines 16, to the low order bits of the output word available over lines 20. The high order bits of the output word are, in the preferred embodiment, filled with logical zero's.

The circuit thus provides support, for example, for multi-way branch instruction which effects a program branch decision based upon the value(s) of selected bits of the data word, for example, stored in register 14. For example, the bit positions can be selected by a mask which follows the opcode in the instruction format. The mask could be stored in register 18 and becomes the controlling signals for selection apparatus 10. The selection circuit then can provide on its output lines, the selected bits for use, for example, as an offset from the top of an address table which is typically identified following the mask in the program instruction. Thus the offset quantity is exactly the data which the processor requires to complete execution of the multi-way branch instruction. Such an instruction is often called a computed GO TO instruction.

According to the preferred embodiment of the invention, the bit selection circuitry 10 alters data flow only when instructed to do so and can therefore be placed and inserted into a data path, such as a bus, within a data processing apparatus. Thus, if no particular bits have been selected by the control signals over lines 16, the output of the bit selection apparatus over lines 20 can be (if all bits are selected by the control signals) identical to the input over lines 12. As will be further described in more detail below, the bit selection apparatus 10 can also be employed (a) to zero the more significant bits of a word input to it while passing the less significant bits unaltered and (b) to shift the data word input one-way, that is, toward the least significant position (losing the word bits shifted past the least significant bit).

Referring now to FIG. 2, the bit selection circuitry 10 has an array of "selection elements" 26, each of which operates as a multiplexing element. Each selection element, according to the preferred embodiment, and referring to FIG. 3, has a first data input over a line 28, a second data input over a line 30, a data output over a line 32, a selection control signal, designated "M", over a line 34, and the complement of the selection control signal, designated $\overline{M}$, over a line 36. (Thus the "selection control signal" in the illustrated embodiment includes the two control input signals over lines 34 and 36.) The apparatus further employs two enhancement mode pass transistors 38 and 39 which are particularly suited for multiplexing operation herein in an NMOS implementation. Thus, the data input signal over line 28 is passed to the output line 32 if the input control signal M on line 34 is set (has a logical one); otherwise, the input data signal over line 30 is passed to the output line.

Referring now to FIG. 2, the selection element 26 of FIG. 3 is arranged in a two-dimensional array for selecting and routing the data inputs over lines 12 to the data outputs over line 20. In the illustrated embodiment, a sixteen bit input word is provided, of which at most four bits will be selected. The output bits, appearing over lines 20, are organized so that the four least significant positions of the output word contain the selected bits and the remaining positions are "zeroed". (See FIG. 5, lines a, b, and c). Thus, in the illustrated embodiment, the input bits appear over lines $12a$, $12b$, ..., $12p$ with line $12a$ representing the least significant bit and line $12p$ representing the most significant bit of the input word. Similarly, the output bits over lines $20a$, $20b$, ..., $20p$ have the least significant bit over line $20a$ and the most significant bit over line $20p$. In this embodiment, the selected bits appear over output lines $20a$, $20b$, $20c$, and $20d$. The selection elements 26, for convenience of reference, are designated by an "E" followed, in parentheses, by a two letter code. The first letter of the code indicates the column of the element, the letter "a" representing the first and beginning column, the letter "b" the next succeeding column, and so on, while the second letter represents the row to which the element belongs, the letter "a" designating the beginning element of a column and the first row; the letter "b" designating the next element of the column, and the second row; and so on.

The number of columns equals at least the maximum number of bits which can be selected and routed to the output lines by the apparatus 10. The output bit on the output line of the beginning element of the ith column (when i is less than or equal to the maximum number of bits which can be selected), represents the ith selected bit. Each column has a connected sequence or chain of selection elements, the elements being connected in a serial manner so that the input line corresponding to line 30 of one element connects to the output line 32 of the next succeeding element (for example the (second) input line to element E(c,d) is the output line of element E(c,e)), and wherein the output line of the last element of a column, for example element E(a,p) of column a, connects to a predetermined value, in the illustrated embodiment zero volts (logical zero). The other (first) inputs to each element of column a, the input corresponding to line 28 of FIG. 3, are respectively the input data word from which a selection of bits is to be made.

The second and succeeding columns of the array are also connected in a serial sequence; however each succeeding column has one less element than the column before it. Thus, in the illustrated embodiment, column a has sixteen elements corresponding to the number of illustrated input lines 12, column b has fifteen elements, column c has fourteen elements, and so on. Each element of the second and succeeding columns receives, respectively, as a first input corresponding to line 28, the same input as the second input line, corresponding to line 30, of the corresponding element of the preceding column. Thus, the first input to element E(b,a) over line 28 comes from the second input to corresponding element E(a,a) over line 30. The last element for each second and succeeding column, that is illustrated elements E(b,o), E(c,n), E(d,m), E(e,l), receives over their respective second input lines, corresponding to the input lines 30 of FIG. 3, a predetermined value, and preferably a value equal to the same predetermined value to which the ending element of the first column is connected, that is, zero volts. The elements of each row, designated corresponding elements to each other, each receive the same selection control signals 16, that is, the signals corresponding to lines 34 and 36 of FIG. 3. These control signals, 16a, 16a', 16b, 16b', . . . , 16p, 16p' (where the "'" represents the complement of the signal) correspond to the signals over lines 16 of FIG. 1, and connect to the elements 26 to provide the bit selection control described in greater detail below.

Operation of the Bit Selection Circuitry

The operation of the apparatus described below can be more easily understood by referring to FIG. 5. In FIG. 5, line a represents an input word, sixteen bits wide, the bits labeled a, b, . . . , p with bit a being the least significant bit of the word and bit p being the most significant bit of the word. Pairs of lines b,c,; d,e,; f,g; and h,i illustrate the result of a control word provided over lines 16 from register 18 operating upon the input word of line a to yield an output over lines 20 for storage in register 22. Clearly, for example, if only four bits are being selected from the input word, register 22 need not be a full sixteen-bit width but could be reduced if desired to a smaller register, for example a four-bit register. Such a four-bit register could be advantageously employed in connection with the computed GO TO instruction referred to above wherein the register would index to a pointer which directs the sequential flow of program instructions.

In operation, as noted above, the control signals over lines 16 select data bits from among input lines 12, and route the data thereon to the low order (least significant) positions of the output lines 20. Assume therefore, in the illustrated embodiment, that four of the control signals over lines 16 are set. The most significant bit set will be designated the "fourth set control bit", while the least significant bit set is designated the "first set control bit". The operation of the apparatus is as follows.

Referring first to column a (in FIG. 2), the zero voltage input to element E(a,p) passes through (and down) the selection elements E of the column until the element receiving the fourth set control bit is reached. At that element, (assume it corresponds to element E(a,m) and hence to input line 12m), the input data bit over line 12m is selected and "falls" or passes downward through the elements of column a until the element receiving the third set selection bit is reached (for example element E(a,i)). This same process occurs for the second set selection bit (at element E(a,g)) and the first set selection bit (element E(a,d)). The input line to the element receiving the first set selection bit (illustrated element E(a,d)) falls through to the beginning element E(a,a) of column a and appears as the output over line 20a.

Referring now to column b, which is one element shorter than column a, the zero volt input to element E(b,o) passes downward until it reaches the element receiving the fourth set control bit. This is at row m. Because the connections from column a to column b effectively move the control selection word one position in the direction of the most significant bit of the input data word, the element E(b,m) which selects the input corresponding to line 28, receives a zero input from the output of element E(a,n). Hence, a zero continues to pass through the elements of column b until it reaches the element receiving the third set control bit. This element E(b,i) receives the output of element E(a,j) which is the input originally from line 12m. The process continues until, at the element receiving the first set control bit, the second selected bit (for example input line 12g) is passed from column a through the first set element of column b, element E(b,d), to the output over line 20b. Similarly, the third and fourth columns provide the third and fourth selected bits respectively over output lines 20c and 20d.

In accordance with the preferred embodiment of the invention, there is further provided a fifth column, column e, which enables additional data manipulations to be accomplished beyond that of merely selecting a fixed number "m" of bits (m=4 in the illustrated embodiment described above), from a larger number "n" of bits input to the apparatus (n=16 in the illustrated example). According to this embodiment of the invention, the fifth column enables various manipulations to be performed upon the upper n−m bits of the output word. Thus, for example, the output of the fifth column, column e, over lines 20e . . . , 20p will be all zero's because the predetermined inputs over line 40 to the second input lines 30 of each last element of each column is zero. Alternately other predetermined inputs can be employed if desired. Clearly, if the additional flexibility of controlling the outputs over lines 20e–20p is not needed, the extra, fifth column of the array need not be employed.

It is also important to note that when every bit in the control word available over lines 16 is set (FIG. 5, lines a, h, i) the data over lines 12 is passed, unaltered, to the output lines 20. This occurs even if the extra column, column e of the illustrated embodiment, is not employed. This allows the selection circuitry to be inserted into a data path, such as a bus of a processor, and operate to alter data flow only when instructed to do so.

Another useful feature of the selection circuit is to zero a more significant portion of a word while passing a less significant portion unaltered. This operation is effected by setting the selection bits corresponding to the low order portion of the word to "ones" and setting the rest of the selection bits of the control word to "zero". (See FIG. 5, lines a, d, and e.) Similarly, by setting a number of the least significant control bits of the control word to "zero", a shift of an upper group of input bits, specified by those control bits set to "one", towards the least significant position of the output word can be effected. The amount of the shift can be selected to be as many positions as desired. (See FIG. 5, lines a, f, and g). These features can be implemented without using the "extra" column, column e in the illustrated embodiment.

Figure 4:
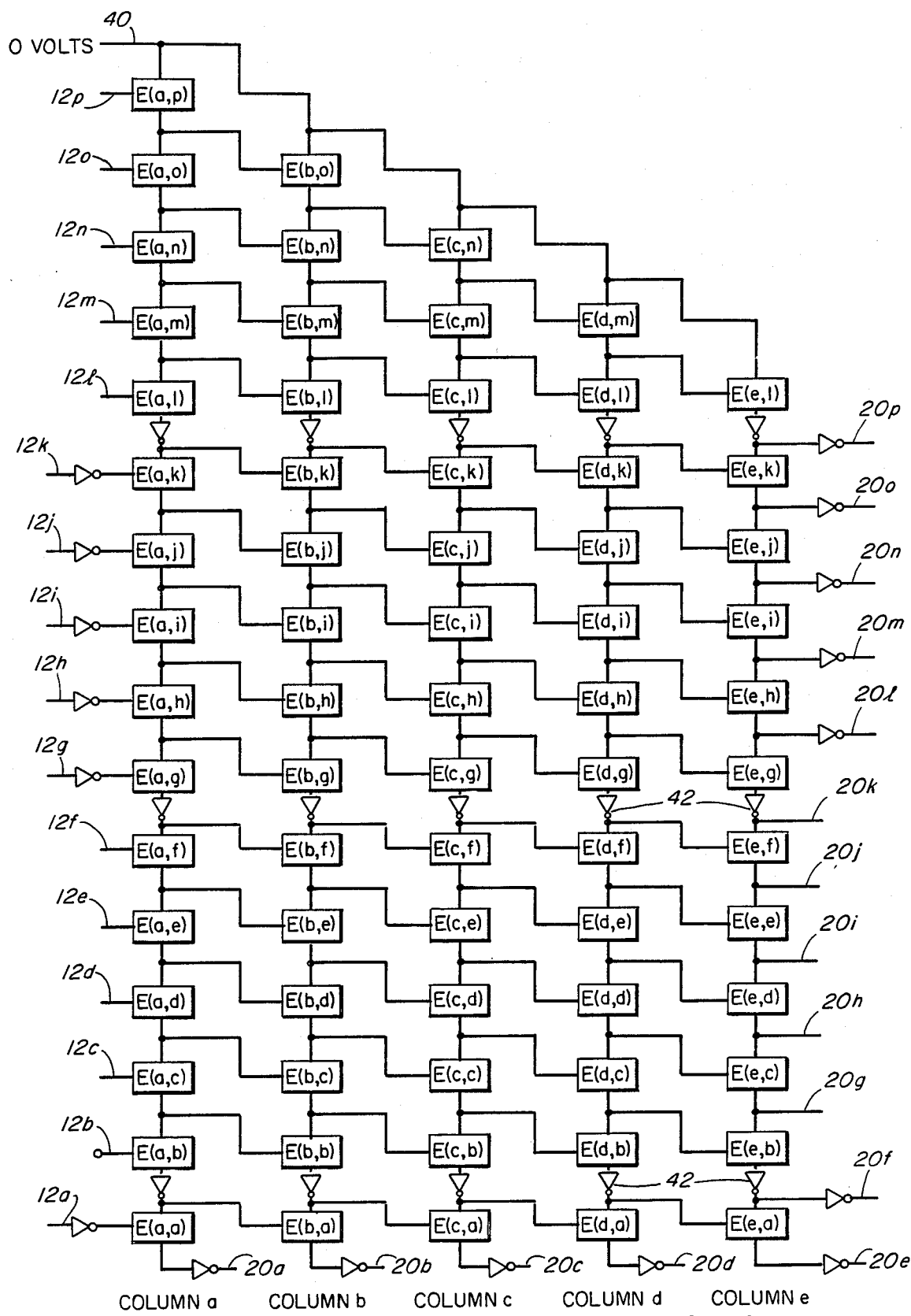
FIG. 4 is an electrical block diagram of the two-dimensional array of FIG. 2 modified to employ inverters to avoid long sequences of pass transistors.

As noted above in connection with FIG. 3, the most desirable implementation of the selection element 26 is in NMOS circuitry; and, as can be seen in FIG. 2, the number of elements 26 increases approximately linearly both with bus width and with the maximum number of bits being selected. The circuit, however, when implemented in NMOS technology, should employ inverters to prevent the series connections of the pass transistors 36 and 38 of elements 26 from growing too long. Accordingly, referring to FIG. 4, if inverters 42 are inserted so that no signal ever propagates more than five pass transistors before its level is restored, satisfactory operation in NMOS technology is attained.

Additions, subtractions, deletions, and other modifications of the described preferred embodiment of the invention will be apparent to those skilled in the art. Thus, the circuitry can be changed to provide for the selection of more or less input bits from an input word having more or less data bits. Similarly, in some apparatus there is no need for the use of the "zeroed" output bits, corresponding to column e of the disclosed embodiment. The circuit can also be implemented in CMOS or any technology which has an element which functions as an analog switch.

It should also be clear to those practiced in the art that the terms "columns" and "rows", as used herein, merely provide a convenient designation to enable the discussion to be more clearly followed and the structure more clearly understood. Other topographies of arrays can be created which map into the row and column structure described herein.

These and other embodiments of the invention are within the scope of the following claims.

What is claimed is:

1. A bit selection and routing apparatus for selecting m data signals from among n available data inputs, where m is less than or equal to n, and grouping said m selected inputs in an output data word, said apparatus comprising a two-dimensional array of signal selection elements, said array having at least m columns, each column having a beginning element, the first column having n elements, and the remaining columns each having one fewer element than the preceding column, each selection element having a first data input, a second data input, a selection control signal input, and a data output, said data output being associated with said first data input in a first selection state of said control signal, and said data output being associated with said second data input in a second selection state of said control signal, the elements in each column being connected in a serial sequence so that the second data input of each element in a column of the array is the data output of a next element in that same column and the second data input of the ending element of each column is a predetermined signal level, the n elements of the first column having as their first inputs respectively, the n data inputs of which m are to be selected, the beginning elements of the second and each succeeding column having, as their respective first data input, the second data input of the beginning element of the preceding column, each other element of the second and each succeeding column having, as their respective first data inputs, the second data input of a corresponding element in a next preceding column, each group of corresponding elements receiving the same control signal for designating the bits to be selected, and the outputs of the beginning elements of the first m columns providing said m selected data signals.

2. The apparatus of claim 1 further wherein
the number of columns equals m+1 and further comprising
means for connecting said m+1'st column to said two-dimensional array for providing a predetermined output signal at all output bit positions thereof.

3. The apparatus of claim 2 wherein said predetermined signal level is "zero".

4. The apparatus of claim 1 further comprising means for applying bit selection control signals to said elements for selecting all of said input bits whereby the selection and routing apparatus can be inserted in a data flow path without altering the flow of data.

5. The apparatus of claim 1 further comprising
means for applying selection control signals to said two-dimensional array for shifting a portion of said input word to least significant positions in the output word.

6. The apparatus of claim 1 further comprising
means for applying selection control signals to said two-dimensional array for zeroing a most significant portion of said input word for providing only a least significant portion of said input word on said output lines.

7. The apparatus of claim 1 further wherein the number of columns denotes the maximum number of input bits to be selected and the beginning element of the ith column has at its output the bit selected by the ith control signal.

8. The apparatus of claim 1 wherein said signal selection element comprises first and second pass transistors implemented in NMOS technology, and
further comprising a plurality of inverters spaced through said array for reducing the length of chains of pass transistors, whereby the passed signals are restored for reliable operation.

9. A bit selection and routing system, comprising

A. an ordered set of n input signal receivers, each of said receivers including means for receiving an associated bit of an n-bit input signal, where n is an integer greater than 1, B. an ordered set of output signal lines, where the number of output signal lines in said set is an integer less than or equal to n, C. selection and routing means responsive to an n-bit control signal for transferring m bits of said received n-bit input signal to an ordered subset of said output signal lines, where m is an integer less than or equal to n, and where said ordered subset includes m consecutive lines of said ordered set of output signal lines, wherein respective bits of said control signal are representative of particular bits of said received n-bit input signal to be transferred to said output signal lines, and wherein each of said respective bits has a first binary value for the ones of said received bits to be transferred and a second binary value otherwise, wherein said selection and routing means comprises
means for applying said m bits of said received input signal substantially concurrently to said ordered subset of said output signal lines, wherein said selection and routing means further comprises
a two-dimensional array of signal selection elements, each said selection element having a first data input, a second data input, a selection control signal input, and a data output, said data output being associated with said first data input in a first selection state of said control signal, and said data output being associated with said second data input in a second selection state of said control signal.

10. A bit selection and routing system according to claim 9, wherein said two-dimensional array of selection elements is arranged in at least m columns, each column having a beginning element, the first column having n elements, and the remaining columns each having one fewer element than the preceding column.

11. A bit selection and routing system according to claim 10, wherein the selection elements of said two-dimensional array are arranged so that the elements in each column are connected in a serial sequence so that the second data input of each element in a column of the array is the data output of a next element in that same column and so that the second data input of the ending element of each column is a predetermined signal level.

12. A bit selection and routing system according to claim 11, wherein said two-dimensional array is further arranged so that
   the beginning element of the second and each succeeding column have, as their respective first data inputs, the second data input of the beginning element of the preceding column, and wherein
   each other element of the second and each succeeding column have, as their respective first data inputs, the second data input of a corresponding element in a next preceding column.

* * * * *